United States Patent

Dennis

[15] 3,689,080

[45] Sept. 5, 1972

[54] SPINDLE ADAPTOR FOR AUTOMATIC RECORD CHANGERS

[72] Inventor: James T. Dennis, 812 American National Bldg., Oklahoma City, Okla. 73102

[22] Filed: July 11, 1969

[21] Appl. No.: 841,025

Related U.S. Application Data

[63] Continuation-in-part of Ser. No. 365,061, May 5, 1964, abandoned.

[52] U.S. Cl...............................................274/10 S
[51] Int. Cl...............................................G11b 17/18
[58] Field of Search..............................................274/10 S

[56] References Cited

UNITED STATES PATENTS

| | | | |
|---|---|---|---|
| 3,191,942 | 6/1965 | Tatter | 274/10 S |
| 2,884,255 | 4/1959 | Wennerbo et al. | 274/10 |
| D218,483 | 8/1970 | Kahler et al. | D56/4 |
| 3,191,941 | 6/1965 | Krahulec | 274/10 |
| 3,245,689 | 4/1966 | Tatter et al. | 274/10 |
| 3,506,274 | 4/1970 | Kelly | 274/10 |

*Primary Examiner*—Leonard Forman
*Assistant Examiner*—Charles E. Phillips
*Attorney*—Mason, Kolehmainen, Rathburn & Wyss

[57] ABSTRACT

An adaptor for a stack of large hole records is provided which is positionable at the center of the turntable and has an interference shoulder thereon. The stack of large hole records is supported on a shelf with the bottom record at the level of the interference shoulder and means are provided for moving the bottom record off of the shelf by overcoming the resistance to movement of said bottom record caused by engagement with said interference shoulder.

5 Claims, 18 Drawing Figures

INVENTOR
JAMES T. DENNIS
by
Mason, Kolehmainen, Rathburn and Wyss
ATTORNEYS.

INVENTOR
JAMES T. DENNIS by

Mason, Kolehmainen,
Rathburn and Wyss
ATTORNEYS.

INVENTOR
JAMES T. DENNIS

BY *Mason, Kolehmainen, Rathburn & Wyss*
ATTORNEYS

INVENTOR:
JAMES T. DENNIS

BY Mason, Kolehmainen, Rathburn & Wyss
ATTORNEYS

INVENTOR:
JAMES T. DENNIS
BY Mason, Kolehmainen
Rathburn & Wyss
ATTORNEYS

SPINDLE ADAPTOR FOR AUTOMATIC RECORD CHANGERS

The present invention is a continuation-in-part of my copending application Ser. No. 365,061 filed May 5, 1964, and now abandoned.

The present invention relates to automatic record changers, and more particularly, to an automatic record changer arrangement for playing enlarged aperture records in an automatic manner.

A large number of existing phonograph records are of the type which have an enlarged centering aperture. These records are usually recorded at 45 r.p.m. and conventional record changer arrangements employ a so-called slip-on spindle arrangement for playing these enlarged aperture records. In most if not all of the prior art slip-on spindle arrangements, the 45 r.p.m. slip-on spindle is positioned over the standard centering spindle of the record changer, and a stack of 45 r.p.m. records may be placed on this slip-on spindle. Usually the slip-on spindle is provided with a pair of supports for the record stack so that the balance arm which is employed to hold a stack of 33⅓ r.p.m. or 78 r.p.m. records on the centering spindle is not required. The slip-on spindle is provided with its own mechanism which is actuated during the record changing cycle. In many of these mechanisms the record is not pushed off of a record supporting shelf, as in the conventional centering spindle for small hole records, but instead both supports are inserted between records and then the bottom record is released. Insertion between records may in some instances cause chipping or cracking of the record adjacent the centering aperture. Also, such arrangements are quite expensive since they require a separate record supporting and releasing mechanism in the slip-on spindle in which mechanism the moving parts must be machined to close tolerances, accurately aligned, etc..

It is, therefore, an object of the present invention to provide a new and improved adaptor for playing enlarged aperture records which eliminates one or more of the above-mentioned disadvantages of prior art arrangements in this field.

It is another object of the present invention to provide an adaptor for playing enlarged aperture records in which the standard centering spindle of the record changer acts as the record supporting means and the record releasing means for the adaptor.

It is a further object of the present invention to provide a new and improved adaptor for playing enlarged aperture records which is extremely simple in construction and is economical to manufacture.

It is still another object of the present invention to provide a new and improved adaptor for playing enlarged aperture records wherein a stack of enlarged aperture records is supported in offset relation to the standard centering spindle of record changer so that the record stack is supported on the shelf of the standard centering spindle itself and is removed by being pushed off of this shelf as in conventional centering spindles for small hole records.

The invention, both as to its organization and method of operation, together with further objects and advantages thereof, will best be understood by reference to the following specification taken in connection with the accompanying drawings in which.

Figures 7, 7A, 10:
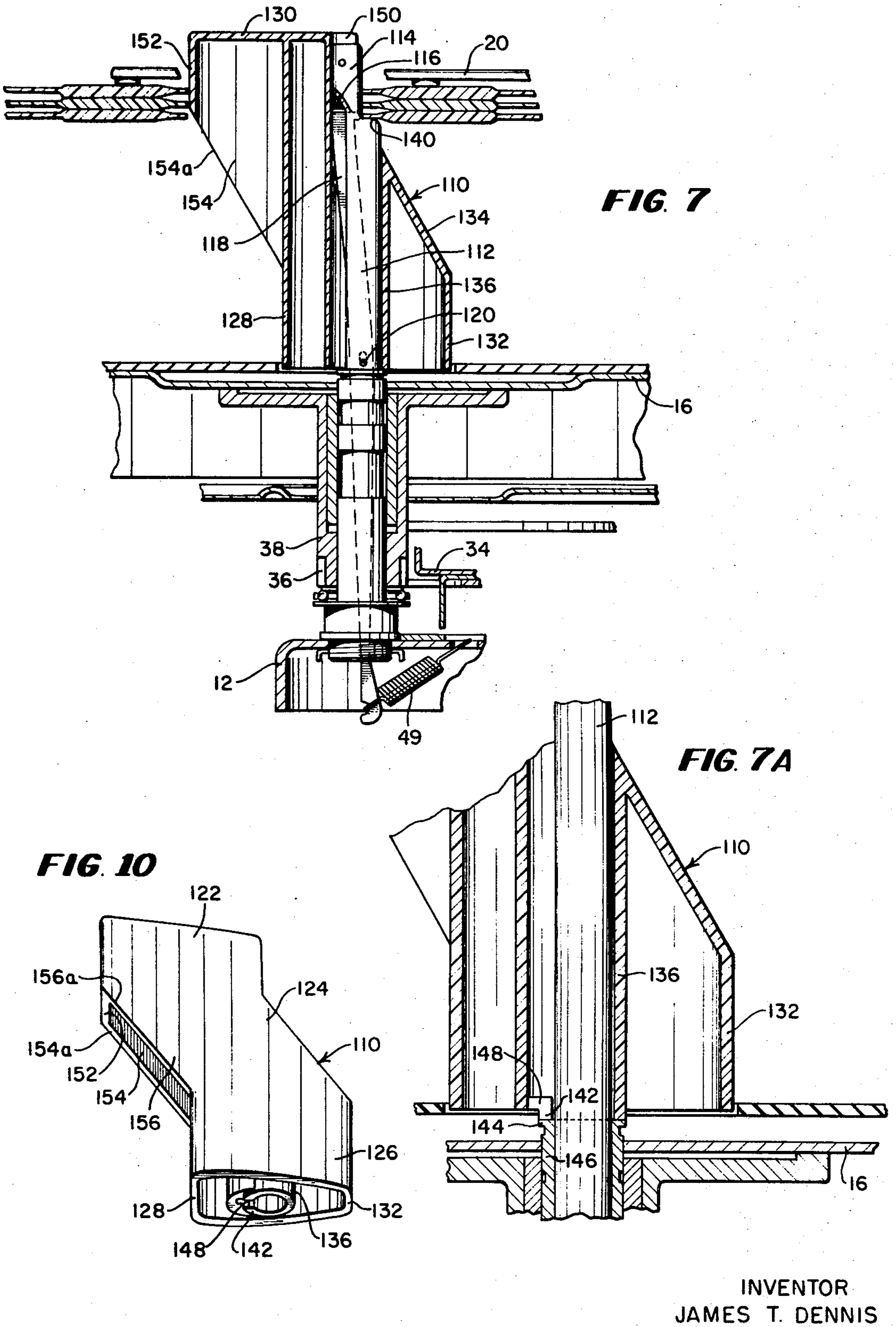
FIG. 7 is a sectional, side elevational view of an automatic record changer arrangement embodying an alternative molded plastic adaptor for large hole records, embodying features of the present invention.
FIG. 7A is a sectional view of the adaptor of FIG. 7 but taken in a larger scale.
FIG. 10 is a perspective view of the adaptor of FIG. 7.
Figure 8:
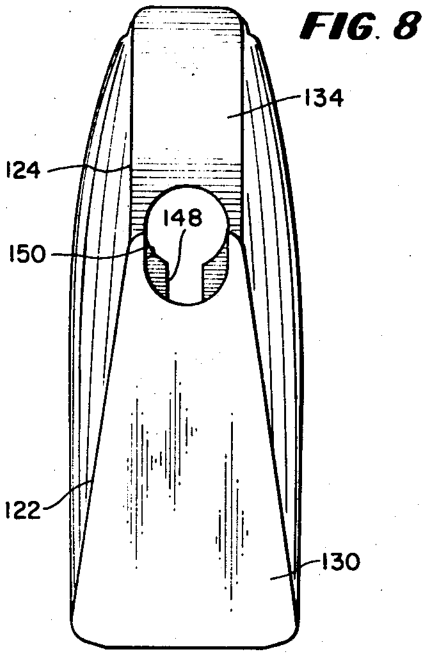
FIG. 8 is a top view of the adaptor of FIG. 7.
Figure 9:
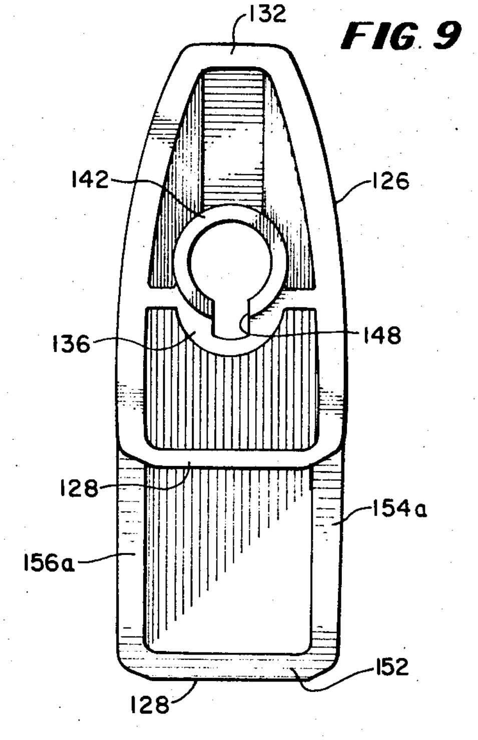
FIG. 9 is a bottom view of the adaptor of FIG. 7.
Figure 15:
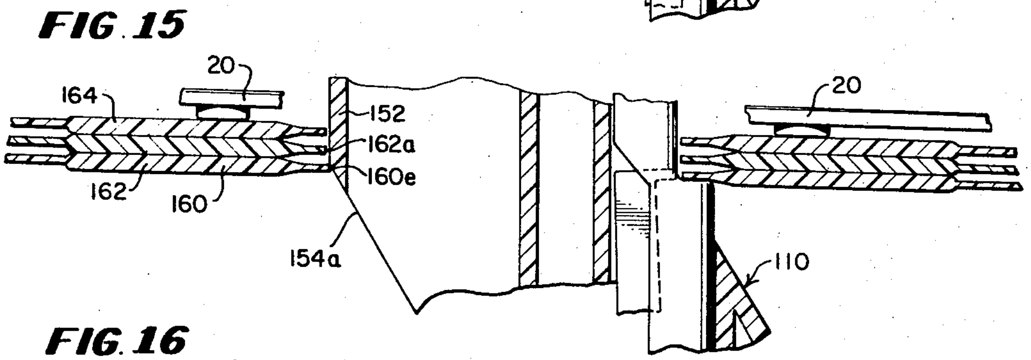
Figure 16:
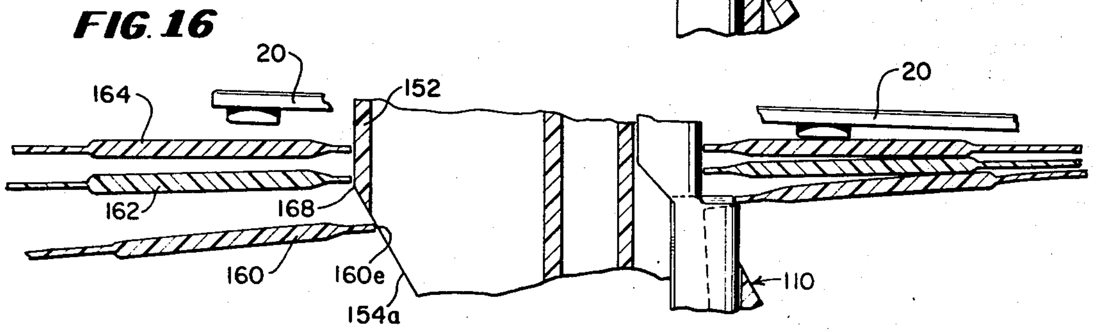
Figure 17:
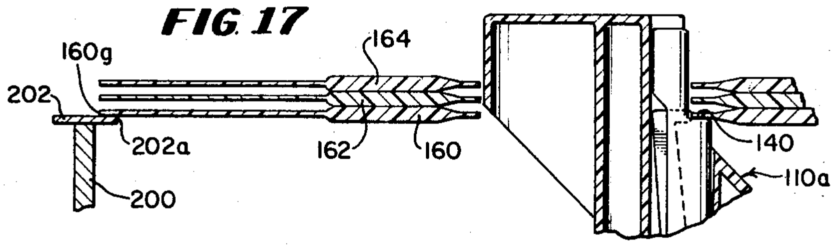

FIGS. 11 to 16, inclusive, are sectional views, taken on an enlarged scale of the adaptor of FIG. 7 and showing the cooperation of the adaptor with large hole records under varying conditions of record thickness and tilt of the record stack; and FIG. 17 is a sectional view, similar to FIG. 7, of a further alternative embodiment of the invention.

Referring now to the drawings and more particularly to FIGS. 1, 2, 3 and 4 thereof, there is shown a portion of a record changer including a main base plate 10 which supports a main base subassembly indicated generally at 12 on which is mounted a centering spindle indicated generally at 14. A turntable indicated generally at 16 is rotatably mounted on a bearing sleeve 18 positioned around the base of the centering spindle 14 so that the turntable 16 rotates about an axis concentric with the axis of the centering spindle 14. A balance arm 20 is arranged to be moved inwardly to a position adjacent the spindle 14 when a stack of records having standard centering apertures of relatively small diameter are positioned on the upper end 22 of the centering spindle 14 and rest on a record supporting shelf 24 formed in the spindle 14. The arm 20 functions to maintain a stack of standard centering aperture records positioned on the spindle 14 in a horizontal position during the record changing operation and may be moved outwardly beyond the record stack when it is desired to remove records from the turntable 16. The balance arm 20 is mounted on the upper end of a balance arm shaft 26 which is slidably and rotatably mounted in a generally cylindrical housing 28 mounted on the main base subassembly 12. A tone arm indexing member 30 is positioned in the path of 10" and 12" records having standard centering apertures which are supported on the spindle 14 when these records are released to the turntable so as to actuate a suitable tone arm indexing mechanism.

The centering spindle 14 is arranged to be actuated during the record changing cycle so as to release the bottom record of the record stack supported on the shelf 24 to the turntable 16. To this end, a main cycling gear 32 is rotatably mounted on the main base subassembly 12 and is arranged to be rotated for one revolution during the record changing cycle by means of a tripping mechanism indicated generally at 34 which functions to initiate connection of the gear 32 with a driving gear 36 positioned on the bottom end of the turntable hub 38. As the gear 32 rotates, a depending pin 40 engages the end 42 of a slidably mounted spindle actuating member 44. An elongated blade 46 is pivotally mounted in the centering spindle 14 on a pivot pin 48 and the bottom end of the blade 46 is held in engagement with the forward end of the spindle actuator member 44 by means of a spring 49. The upper end of the blade 46 is provided with an offset lug portion 50 which is adapted to engage the inner edge of the bottommost record positioned on the record shelf 24 and move this record sidewardly until it clears the shelf 24 and thereafter drops to the turntable 16. The spring 49 insures that the blade 46 will be returned to its initial position shown in FIG. 1 during the succeeding portion of the record changing cycle.

In order to prevent all of the records except the bottom record of the stack from being moved sidewardly by the lug portion 50, a blade 52 is slidably mounted in a slot 53 (FIG. 3) provided in the upper portion 22 of the centering spindle 14 and is guided by means of a transverse pin 54 provided in the upper portion 22 of this spindle. The blade 52 is provided with a slot (not shown) which receives the pin 54 and locates this blade so that the bottom tip thereof is positioned so as to prevent all records but the bottom record of the stack from moving sidewardly when the blade 46 is actuated during the record changing cycle. However, when records are to be removed from the centering spindle after they have been played, the blade 52 is cammed upwardly by engagement of the top record of the stack therewith so as to permit ready removal of the record stack from the spindle 14.

The automatic record changing arrangement described thus far is similar to the arrangement described in my application Ser. No. 265,421, now U.S. Pat. No. 3,321,205, filed Mar. 15, 1963 and reference may be had to this copending application for a detailed description of the pertinent portions of this record changer.

Considering now the adaptor arrangement of the present invention, there is provided a 45 r.p.m. slip-on adaptor indicated generally at 60. The adaptor 60 comprises a solid body member, which may be formed of any suitable material such as wood, plastic or the like, and is provided with a vertically extending opening 62 which is adapted to receive the standard centering spindle 14 so that the slip-on adaptor 60 may be placed over the centering spindle 14 and occupy the position shown in FIG. 1. Since the centering spindle 14 is provided with an offset upper end portion 22, the opening 62 is somewhat elliptical (FIG. 4) so as to permit insertion of the adaptor 60 over the spindle 14. However, the upper end 62a of the opening 62 is formed to receive the upper end 22 of the spindle 14 snugly so that the upper portion of the adaptor 60 is accurately positioned. Also in order that the bottom portion of the adaptor 60 will be positioned correctly with respect to the spindle 14, a washer 64 is secured to the bottom end of the adaptor 60 and is provided with an opening 66 just slightly larger than the corresponding adjacent portion of the spindle 14. When the adaptor 60 is placed over the spindle 14 the adaptor 60 may be tilted slightly so that the aperture 66 in the washer 64 may be worked over the shelf 24 and may then be slid downwardly to the position shown in FIG. 1. The adaptor 60 is registered properly in the vertical direction with respect to the shelf 24 of the spindle 14 by engagement of the end wall 68 of the opening 62a with the rounded top of the upper end portion 22 of the centering spindle 14.

Figure 1:
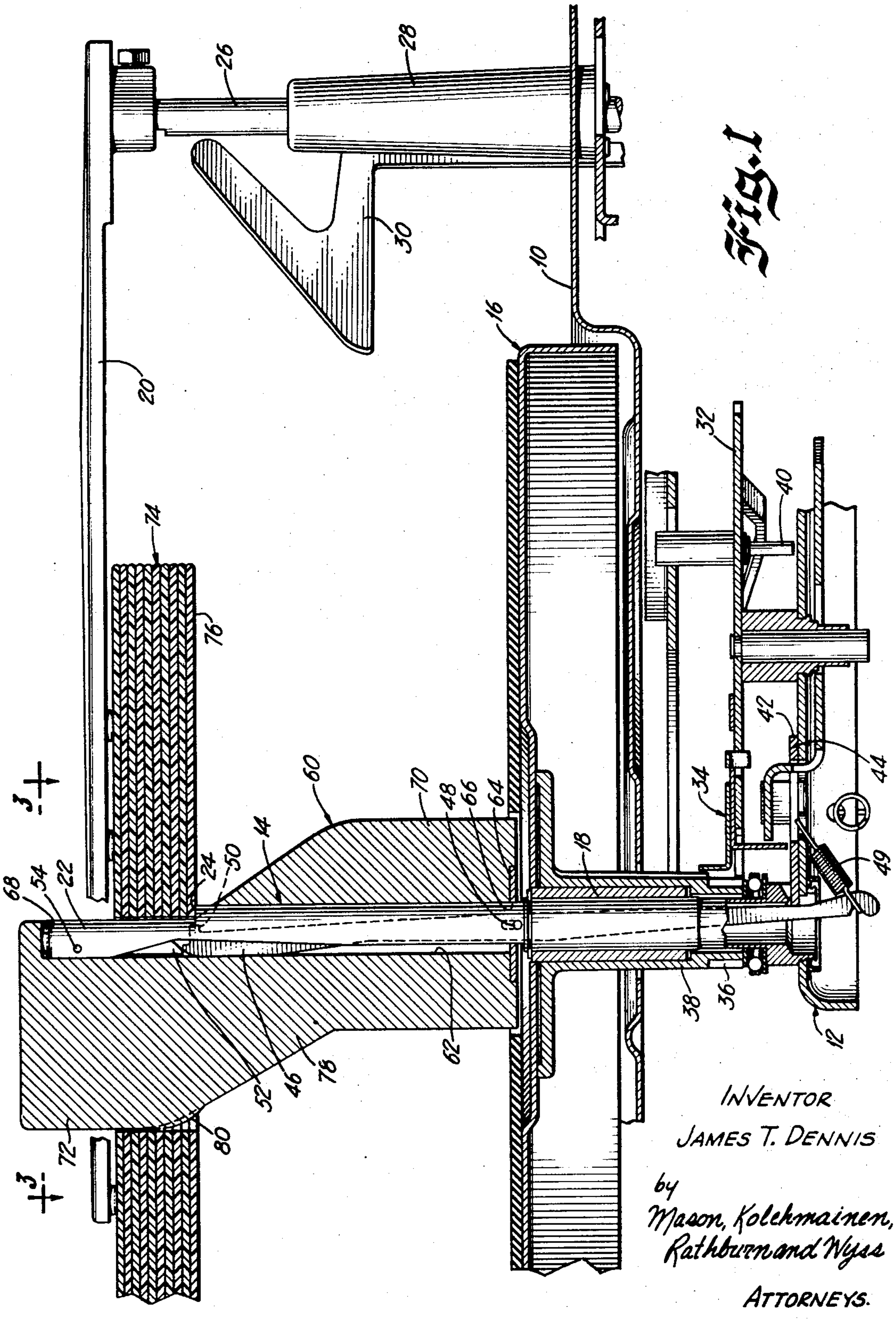
FIG. 1 is a sectional side elevational view of an automatic record changer arrangement embodying the features of the present invention.

When the adaptor 60 is positioned in the manner shown in FIG. 1, the cylindrical surface of the bottom portion 70 thereof is positioned concentrically with the centering spindle 14 but the upper portion 72 thereof is positioned in offset relation to the spindle 14 by an amount such that a stack of enlarged aperture records, indicated generally at 74, rests on the shelf 24 of the standard centering spindle 14. Thus the spindle 14, in accordance with the present invention, acts as a record stack support for either a stack of standard centering aperture records or a stack of enlarged aperture records and the offset upper end portion 72 of the adaptor 60 functions in conjunction with the balance arm 20 to hold the enlarged aperture record stack on the shelf 24.

The arrangement of the present invention also contemplates utilizing the pivotally mounted blade 46 of the centering spindle 14 as the record releasing member for the stack 74 of enlarged aperture records. More particularly, when the blade 46 is actuated in the manner described in detail heretofore during the record changing cycle, the lug portion 50 thereof will engage the inner edge of the bottommost record 76 (FIG. 2) and move this record sidewardly to the position shown in FIG. 2 and the bottom record 76 will slide down the sloping portion 78 of the adaptor 60, which joins the upper portion 72 and the bottom portion 70, and down the bottom portion 70 onto the turntable 16 as the blade 46 is returned to its rest position shown in FIG. 1.

Figures 2, 3, 4, 5, 6:
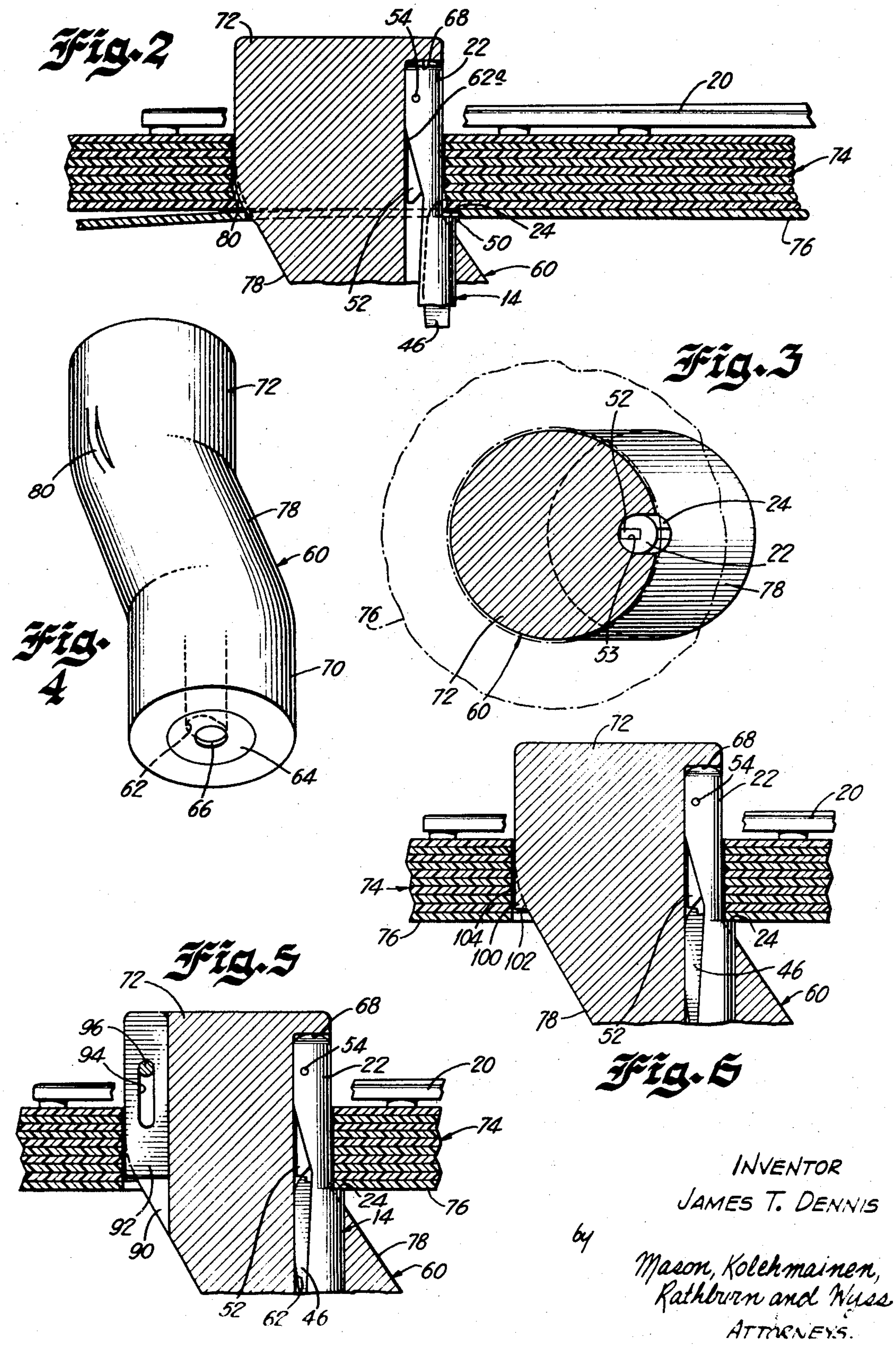
FIG. 2 is a fragmentary sectional view of the upper portion of the adaptor arrangement of FIG. 1 showing the manner in which the bottom record of the stack is released to the turntable.
FIG. 3 is a sectional view taken along the line 3—3 of FIG. 1.
FIG. 4 is a perspective view of the adaptor of FIG. 1.
FIG. 5 is a fragmentary side elevational view of an alternative adaptor arrangement of the present invention.
FIG. 6 is a fragmentary sectional view of a further alternative adaptor arrangement of the present invention.

In order to prevent the other records of the stack from moving sidewardly with the bottom record by an amount such that one or more of them would clear the edge of the shelf 24, there is provided a shoulder 80 on the adaptor member 60 adjacent the edge of the enlarged aperture records in the stack 74 which is directly opposite the edge portion supported on the shelf 24. Thus, as the bottom record 78 is moved sidewardly by the blade 46, as shown in FIG. 2, the upper records are prevented from moving sidewardly a substantial amount by the shoulder 80. In this connection it will be understood that the bottom record 76 may flex slightly as it slides by the bottom curved portion of the shoulder 80 when the blade 46 moves the bottom record 76 during the record changing cycle.

In FIG. 5 there is shown an alternative arrangement for preventing all the records of the stack 76 from moving sidewardly except the bottom record 76. Referring to this figure, a slot 90 is provided in the upper portion 72 of the adaptor 60 and a flat blade member 92 is slidably mounted in the slot 90 by providing a slot 94 in the blade 92 which is guided by a transverse pin 96 which extends through the slot 90 and is secured in the adjacent portions of the adaptor 60. Blade 92 normally drops of its own weight within the slot 90 until the slot 94 engages the pin 96 so that the blade 92 normally occupies the position shown in FIG. 5 in which position the bottom end of the blade 92 is positioned just slightly above the upper surface of the bottom record 76. Accordingly, when the blade 46 of the centering spindle 14 is actuated during the record changing cycle and moves the bottom record 76 to the right, as viewed in FIG. 5, the blade 92 positively prevents all of the other records in the stack 74 from moving with the bottom record as the bottom record is deposited onto the turntable. However, when it is desired to remove the stack of records from the turntable 16 after they have been played, the blade 92 is cammed upwardly by engagement of the upper edge of the top record of the stack with the bottom edge of the blade 92 so that the record stack can be readily removed from the adaptor 60 without removing this adaptor from the centering spindle 14.

In FIG. 6 of the drawings there is shown a further alternative embodiment of the present invention. In this embodiment the shape of the shoulder 80 of the embodiment of FIGS. 1 to 4, inclusive, is modified. More particularly, in the arrangement of FIG. 6, a shoulder 100 is provided which terminates in a substantially horizontal ledge 102 which is positioned slightly above the upper surface of the bottom record 76 of the stack 74. The vertically extending edge 104 of the shoulder 100 is coextensive with the edge of the upper portion 72 of the adaptor 60 so that all of the records in the stack 74, except for the bottom record 76, are positively prevented from moving sidewise as the bottom record is released to the turntable 16. In other respects the arrangement of FIG. 6 is identical to that described above in detail in connection with the embodiment of FIGS. 1 to 4, inclusive.

While the standard centering spindle 14 has been illustrated as being of the type provided with an offset upper end portion 22, it will be readily understood that any other type of standard centering spindle may be employed insofar as the present invention is concerned. Thus, the centering spindle may comprise the type in which the upper end portion is not offset but instead a recess into the side of the spindle is provided to form the record supporting shelf 24. With such a centering spindle, the shape of the shoulder 80 would be arranged so as to prevent all but the bottom record from being released to the turntable, as will be readily understood by those skilled in the art.

It will be noted that the balance arm 20 is utilized to maintain the record stack substantially horizontal when either a stack of standard centering aperture records is supported on the centering spindle 14 directly or when a stack of enlarged aperture records is supported on the record shelf 24 and positioned in offset relation by the adaptor 60.

Referring now to the alternative embodiment of the present invention shown in FIGS. 7 to 16, inclusive, of the drawings, a molded plastic adaptor for large hole records, indicated generally at 110, is shown in conjunction with a spindle 112 which is adapted to support and center a stack of small hole records in a conventional manner. The spindle 112 is generally similar to the spindle 14 shown in FIG. 1 except for the fact that the upper portion 114 of the spindle 112 is somewhat shorter than the upper portion 22 of the spindle 14. A vertically slidable guide member 116 for small hole records is mounted in the upper portion 114 of the spindle 112, this member being similar to the member 52 of the spindle 14. A record ejecting member 118 is pivotally mounted within the hollow body of the spindle 112 on the supporting pin 120. With regard to those portions of the record changer itself which are identical to the record changer shown in FIG. 1, similar reference characters have been applied to such portions in the arrangement shown in FIGS. 7 to 16, inclusive.

Referring now to the constructional features of the large hole record adaptor 110, this adaptor includes an upper portion 122 of generally pie-shaped cross section, an intermediate inclined portion 124 also of pie-shaped cross section, and a bottom offset portion 126 which is of oval-sided wedge-shaped cross section. The rear wall 128 of the bottom section 126 is extended upwardly to the top wall 130 of the adaptor 110 to provide stiffness for the adaptor unit. The forward wall 132 of the bottom section 126 extends upwardly to meet the inclined forward wall 134 of the intermediate portion 124, the front wall 134 joining a vertically extending oval-shaped tubular portion 136 which is adapted to receive the centering spindle 112.

In order to position the adaptor 110 accurately with respect to the record-supporting shelf 140 and the record ejector member 118 of the centering spindle 112, the tubular portion 136 of the adaptor 110 is provided with a downwardly depending circular boss portion 142 (FIG. 10) which is adapted to seat on the upper end flange 144 (FIG. 7A) of the turntable bearing sleeve 146 within which the centering spindle 112 is mounted, the bearing sleeve 146 mounting the turntable 16 for rotation, as described heretofore in connection with the embodiment of FIG. 1. Since the upper portion 114 of the spindle 112 and the record ejector member 118 are offset from the main tubular portion of the spindle 112, the circular boss portion 142 is provided with a keyhole slot 148 to permit insertion of the adaptor 110 over the upper end of the spindle 112 so that the adaptor 110 may be moved to the position shown in FIGS. 7 and 7A in which the boss 142 is seated on the upper end flange 144 of the bearing sleeve 146. It will be noted that the upper end 150 of the tubular portion 136 is open above the upper end 114 of the spindle 112 so that the adaptor 110 may be economically manufactured as a one-piece molded plastic adaptor while at the same time providing an accurate registration between the adaptor 110 and the shelf 140 when the adaptor is positioned for cooperation with the record ejector member 118.

The rear wall 152 of the upper portion 122 of the adaptor 110 joins with a pair of side wall flanges 154 and 156, the edges **154*a* and 156*a* of the side wall portions 154 and 156 acting as the rear guiding surface of the inclined intermediate portion 124 of the adaptor 110. The bottom edge of the rear wall 152 is inclined downwardly and inwardly and joins the inclined edges 154*a* and 156*a* so as to provide inclined or sloping guide means capable of guiding the bottommost record of a stack of large hole records as it is ejected by the record-ejecting member 118 while at the same time positively preventing the next record above the bottom record from being dropped at the same time the bottom record is dropped. More particularly, referring to FIGS. 11 and 12, the cooperation of the adaptor 110 with the spindle 112 in centering a stack of large hole records, 160, 162 and 164 which are supported on the shelf 140 of the centering spindle 112 is therein illustrated. The large hole records, 160, 162 and 164 are of the type having a center portion 160***a* of reduced thickness, an intermediate portion 160*b* of normal thickness and an outer portion 160*c* of reduced thickness in which latter portion the music or other selection is recorded. However, it will be understood that the adaptor of FIGS. 7 to 16, inclusive, will function equally well with records of uniform thickness, as shown in the embodiment of FIGS. 1 to 4, inclusive, for example.

Figure 11:
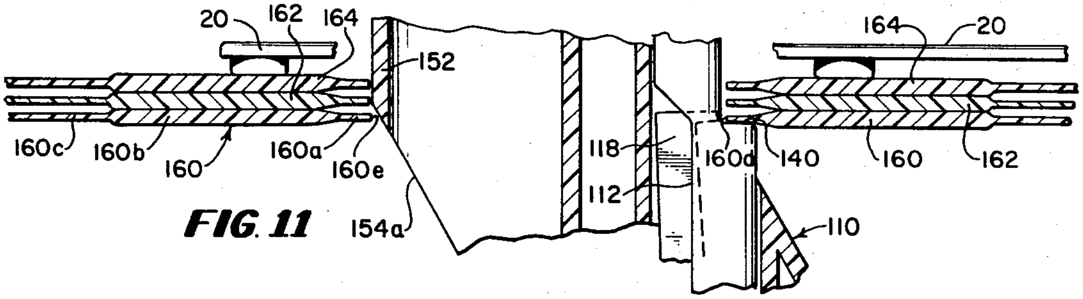
Figure 12:
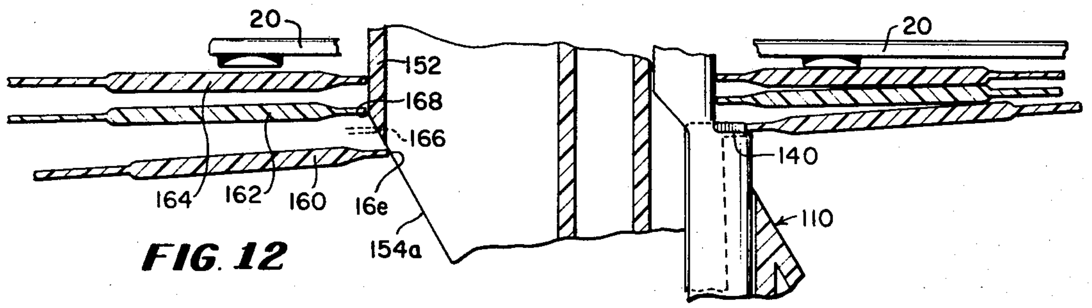

In FIG. 11 the positioning of a stack of large hole records is shown with one edge of the bottommost record 160 supported on the shelf 140 and the entire stack in alignment with the back edge 152 of the adaptor 110, as it would be when a stack of records is first placed on the shelf 140 of the spindle 112. As the record ejecting member 118 is moved during the record changing cycle it engages the adjacent edge 160*d* of the bottommost record 160 and moves it to the position shown in dotted lines in FIG. 12 at which time the opposite edge 160*e* of the record 160 strikes the inwardly and downwardly inclined shoulders formed by the bottom edge of the wall 152 and the side walls 154*a* and 156*a*. These guide members thus form an interfering surface in the path of the record edge 160*e* which must be overcome by force supplied by the record ejector member 118 before the bottom record can be moved off of the shelf 140. Thus, as the ejector member 118 continues to move to the right, as viewed in FIG. 11, the edge 160*e* of the record 160 is forced to move relative to the above-described guide shoulders to the position shown in FIG. 12 at which point the edge 160*d* of the record 160 is positioned on the front edge of the shelf 140 and is about to be dropped to the turntable below. If the adaptor 110 remains stationary, as shown in FIGS. 11 and 12, the relative movement between the edge 160*e* and the interfering guide means is accomplished by forcing the bottom record 160 to cam downwardly along the inclined guide shoulders due to the fact that the diameter of the centering aperture, i.e., the distance between the edges 160*d* and 160*e* of the record 160, is substantially less than the distance from the forward edge of the shelf 140 to the inclined guide shoulders at the same horizontal level as the shelf 140. The edge 160*e* of the record 160 is thus forced or cammed downwardly along the inclined guide shoulders from the position shown in dotted lines at 166 in FIG. 12 to the position shown in full lines in FIG. 12 at which point the bottommost record is released to the turntable. However, if the spindle 112 is loose within the portion 136 of the adaptor 110, and since the record stack is supported on the shelf 140 of the small hole record spindle 112, the force exerted by the ejector member 118 on the record edge 160*e* may cause the adaptor 110 itself to lift upwardly, thus permitting the bottom record to be moved far enough to the right, as viewed in FIGS. 11 and 12, to move off of the shelf 140. In either case, the guide shoulders provide an interfering surface in the path of the bottom record which must be overcome by a positive force before the bottom record can be moved off of the shelf 140.

Figure 13:
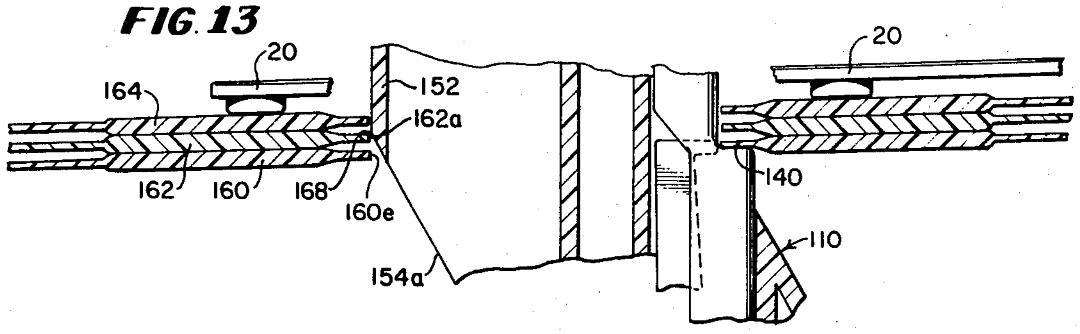
Figure 14:
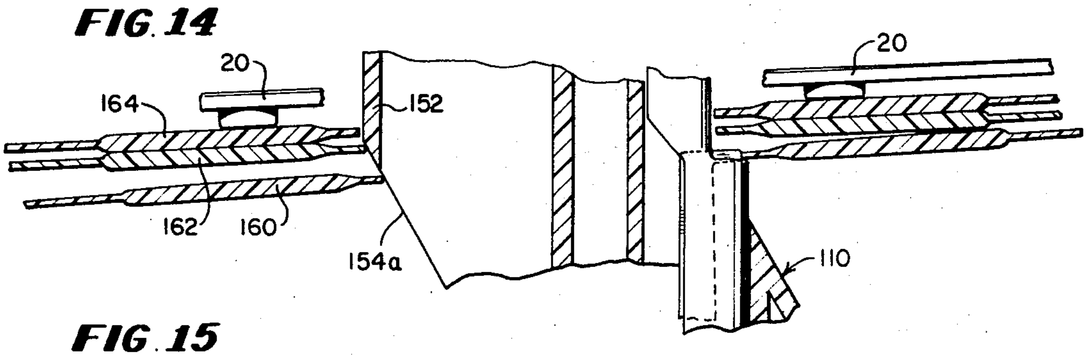

During movement of the bottom record 160 off of the shelf 140, the next record 162 is prevented from being dropped with the bottom record 160 by engagement of the edge 162*a* thereof with the rear wall 152 of the adaptor 110. However, since the record stack may be tilted, due to misalignment or bending of the balance arm 20, or other factors, the situation may well occur wherein both the bottom record 160 and the next record 162 are positioned below the point 168 (FIG. 13) at which the outer bottom edge of the rear wall 152 joins the inclined guide shoulders, such a condition being shown in FIGS. 13 and 14. Under these conditions, when the stack of records is initially placed on the shelf 140 the records will occupy the position shown in FIG. 13 and it will be noted that the inner edge 162*a* of the record 162 is also positioned to engage the inclined guide shoulders. However, as the bottom record 160 is moved to the right by the record ejecting member 118 the second record 162, which is not engaged or positively driven by the ejector member 118, can be moved to the right only by frictional engagement of the records 160 and 162 and then only until the edge 162*a* thereof strikes the inclined guide shoulders. When this occurs the second record 162 is positively prevented from further movement to the right (as viewed in FIG. 14) while the bottom record 160 continues to be moved by the ejector member 118 to the position shown in FIG. 14 at which point the record 160 is about to be moved off of the front edge of the shelf 140 and deposited on the turntable. In this connection, it is pointed out that even if the record stack is not tilted as shown in FIGS. 13 and 14, the thickness of the records in the stack may vary considerably with record manufacturer and vintage so that the next to the bottom record may be opposite the inclined guide shoulders. Accordingly, the second record 162 can move only a slight distance to the right, to the position shown in FIG. 14, and is positively prevented from being dropped with the bottom record, even though the record stack may be tilted, or the records may be of sufficient thinness that the second record will be below the edge 168 at which the inclined guiding shoulders begin. It will also be noted that the inclined guiding shoulders formed by the side walls 154*a*, 156*a*, and the bottom edge of the rear wall 152, operate in a manner similar to the shoulder 80 provided in the adaptor 72 shown in FIGS. 1–4, inclusive. Both of these embodiments prevent the second record from the bottom from being dropped even though the next record from the bottom is at an abnormally low level with respect to the supporting shelf of the small hole record centering spindle. This is in contradistinction to the undercut edge arrangement shown in FIGS. 5 and 6 wherein the second record may, under certain conditions including those indicated above, move under the member 92 (FIG. 5) or under the shoulder 100 (FIG. 6) and be dropped with the bottom record. It is also pointed out that the bottom record 160 may be flexed or bowed slightly as it is cammed relative to the inclined guide shoulders of the adaptor 110 by the record ejector member 118, in the same manner as described heretofore in connection with the shoulder 80 of the adapter 60 shown in FIGS. 1–4, inclusive.

The adaptor 110 is also arranged to prevent the dropping of the next record above the bottom record in the event that the record stack is tilted in the opposite direction, as illustrated in FIGS. 15 and 16. Referring to these figures, the bottom record 160 is indicated as being tilted upwardly to a point at which the edge 160*e* is just below the junction 168 of the outer edges of the wall 152 and the inclined guide shoulders. Under these conditions the bottom record 160 is cammed a considerable distance down the inclined guide shoulders and is finally ejected from the front edge of the shelf 140. However, the second record 162 is prevented from being dropped with the bottom record by engagement of the edge 162*a* thereof with the rear wall 152 of the adaptor 110, as shown in FIG. 16. In this connection it is noted that the record tilt and separation in FIGS. 12 to 16, inclusive, is slightly exaggerated for purposes of illustration.

While the elements 152, 154a and 156a of the adaptor 110 have been referred to an inclined guide shoulders or inclined guide means, it is pointed out that these shoulders may have any desired shape, as may the shoulder 80 in the embodiment of FIGS. 1 to 4, inclusive, so long as the guide means provides an interfering surface at the level of the bottom record of the stack which is positioned in the path of the bottom record as it is moved off of the supporting shelf. This interfering surface provides an obstruction which must be overcome by the application of a positive force to the bottom record by the record ejector member and since a force of this magnitude is not transmitted to the next record 162, this next record is positively prevented from dropping with the bottom record.

It should also be understood that the feature of providing an interfering surface in the path of the record being ejected will function equally well if the supporting shelf for the records is on the adaptor instead of on the spindle. Such an arrangement does require closer tolerances to align the ejector blade and the shelf, but the shelf on adapter type of arrangement would still allow for varying record thicknesses and tilting of the record stack without producing a multiple drop of the records.

It should be understood that insofar as the feature of providing an interfering surface in the path of the record being ejected is concerned, the stack of large hole records may be supported from their outer edge and on a shelf at the center hole of the record. Such an arrangement is shown in FIG. 17 wherein the adaptor 110*a* is shown in conjunction with an edge supporting post 200 having a platform 202 on which the outer edge 160*g* of the bottom record 160 rests. The adaptor 110*a* has a somewhat more steeply sloped intermediate portion but in other respects is similar to the adaptor 110. In the arrangement shown in FIG. 17 the bottom record 160 may be ejected either by an edge ejector member associated with the platform 202 or by an ejector member mounted in the spindle. As the bottom record is ejected, it will bow downwardly as the edge 160*e* moves down the inclined guide shoulders until the outer edge 160*g* moves off of the platform edge 202*a*. Preferably, the distance from the outer edge 160*g* to the platform edge 202*a* is slightly less than the distance from the edge 160*d* (FIG. 11) to the edge of the shelf 140 so that the record moves off of the platform 202 before it leaves the shelf 140. In the arrangement of FIG. 17 the balance arm 20 is not required. It will also be noted that even with the more gradully sloped intermediated portion of the adaptor 110*a* an interfering surface is still presented in the path of the record being ejected which positively prevents multiple dropping of records. It should be understood that the post 200 is supported in any suitable manner from the base of the changer and may, if desired, be moveable, removeable or retractable for playing larger diameter records or to facilitates manual playing of records.

It is also pointed out that the use of an interfering surface at the level of the bottom record facilitates the loading of a stack of large hole records without dropping the bottom record since a positive force is required to move the bottom record off of the supporting shelf. Also the provision of a sloping or inclined continuous shoulder, i.e., the surfaces 154*a* and 156*a*, facilitates the removal of a stack of records from the turntable because no obstacles similar to the shoulder 100 in FIG. 5 is present. The records are tilted somewhat during removal to move freely past the shelf 140.

While there have been illustrated and described several embodiments of the present invention, it will be apparent that many variations may be made therein, all within the true spirit and scope of the invention.

What is claimed as new and desired to be secured by Letter Patent of the United States is:

1. In a phonograph, the combination of, a record ejecting spindle having a fixed shelf for supporting and centering small hole records, a record ejector member mounted for movement on said spindle and movable with respect to said fixed shelf during a record changing operation to move the bottom record of a stack of small hole records positioned on said shelf off of said shelf, a spindle adaptor having a body with a passage therein for receiving said record ejecting spindle when said adaptor is placed in operative position thereon, said passage opening to the periphery of the adaptor body at the level of said fixed shelf and record ejecting member of said spindle, said adaptor when in said operative position locating a stack of large hole records which is supported on said shelf so that the lowermost record of said large hole record stack is dropped onto a turntable by engagement with said record ejecting member, and shoulder means on said adaptor body for restraining large hole records above the bottom record of a large hole record stack so that they are not moved off said shelf with said bottom record.

2. In a phonograph, the combination of a record ejecting spindle including a vertically extending body portion and having means defining a fixed shelf for supporting and centering a stack of small hole records, means defining an outwardly projecting shoulder adjacent the lower end of said body portion of said record ejecting spindle, a record ejector member mounted on said body portion and movable with respect to said fixed shelf, said record ejector member being operative to move the bottom record of a stack of small hole records off of said fixed shelf, a spindle adaptor having a body with a passage therein for receiving said record ejecting spindle when said adaptor is placed in operative position thereon, means defining a support area adjacent the bottom end of said passage which is arranged to be seated on said shoulder portion to locate said adaptor in operative position with respect to said record ejector member, said passage opening to the periphery of said adaptor body at the level of said record ejector member, wherein the stack of large hole records is aligned by said adaptor and is supported on said shelf of said record ejecting spindle, and shoulder means on said adaptor body for restraining large hole records above the bottom record of a large hole record stack so that they are not moved off said shelf with said bottom record.

3. In a phonograph, the combination of, a record ejecting spindle having a fixed shelf for supporting and centering small hole records, a record ejector member mounted for movement on said spindle and operative to move the bottom record of a stack of small hole records positioned on said fixed shelf off of said fixed shelf, a spindle adaptor having a body with a passage therein for receiving said record ejecting spindle when said adaptor is placed in operative position thereon, said passage opening to the periphery of said adaptor body at a support position for a stack of large hole records at which position the bottom record of the stack is at the level of said record ejector member, and a sloping shoulder on said body opposite said passage opening therein and positioned in the path of said bottom record to be engaged by the record as it is moved by engagement with said record ejector member, said adaptor when placed in said operative position being positioned so that the engaged point on said sloping shoulder is spaced from the extreme forward edge of said fixed shelf by an amount more than the hole diameter of a large hole record.

4. The combination of claim 3, wherein the stack of large hole records is aligned by said adaptor and is supported on said shelf of said record ejecting spindle.

5. In a phonograph, the combination of, a record ejecting spindle having a shelf for supporting and centering small hole records, a record ejector member mounted for movement on said spindle and operative to move the bottom record of a stack of small hole records positioned on said shelf off of said shelf, a spindle adaptor having a body with a passage therein for receiving said record ejecting spindle when said adaptor is placed in operative position thereon, said passage opening to the periphery of said adaptor body at a support position for a stack of large hole records at which position the bottom record of the stack is positioned to be engaged by said record ejector member, and a continuously sloping shoulder on said body opposite said passage opening and extending both inwardly toward the axis of said spindle and downwardly with respect to a plane transverse to said passage in an area including the level of said bottom record for preventing records above said bottom record from being dropped with the bottom record as it is ejected by said record ejector member by engagement with said continuously sloping shoulder at a point which is spaced from the extreme forward edge of said shelf by an amount more than the hole diameter of a large hole record.

* * * * *